(12) United States Patent
Schötz et al.

(10) Patent No.: US 6,289,161 B1
(45) Date of Patent: Sep. 11, 2001

(54) OPTICAL COMPONENT CONTAINING A MAXIMUM OF 200 WT.-PPM OF CHLORINE

(75) Inventors: Gerhard Schötz, Aschaffenburg; Jan Vydra, Hanau, both of (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/198,883

(22) Filed: Nov. 23, 1998

(30) Foreign Application Priority Data

Jul. 28, 1998 (DE) .......................................... 298 13 318 U

(51) Int. Cl.$^7$ .................................................. G02B 6/00
(52) U.S. Cl. ............................................................ 385/142
(58) Field of Search .................................. 385/122–128, 385/142, 141, 144

(56) References Cited

U.S. PATENT DOCUMENTS

| 4,165,915 | * | 8/1979 | Rau et al. . |
| 4,579,571 | * | 4/1986 | Hicks, Jr. . |
| 5,049,175 | * | 9/1991 | Ross et al. . |

FOREIGN PATENT DOCUMENTS 3-12340 * 9/1989 (JP) .

OTHER PUBLICATIONS

Schotz et al. New Silica Fiber for Broadband Spectroscopy (Dec. 2, 1997).
Lu, et al. Optical Fiber for UV–IR Broadband Spectroscopy SPIE vol. 3355, pp. 884–891 (Mar. 1998).

* cited by examiner

Primary Examiner—Frank G. Font
Assistant Examiner—Tu T. Nguyen
(74) Attorney, Agent, or Firm—Fulbright & Jaworski, LLP

(57) ABSTRACT

In a known optical component a cylindrical glass core of synthetic quartz glass contains hydroxyl groups, a maximum 200 wt.-ppm of chlorine, and no dopant in the form of a metal oxide. The glass core is axially enveloped by a glass mantle of doped quartz glass which has a lower refractive index than the glass core. Setting out from this, in order to offer an optical component of quartz glass for broad-band transmission, especially for broad-band spectroscopy, which is characterized by low attenuation over a broad range of wavelengths, it is proposed by the invention that the core glass contain less than 5 wt.-ppm of hydroxyl groups.

5 Claims, 1 Drawing Sheet

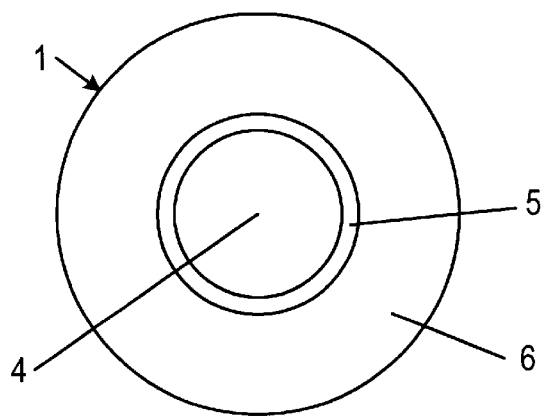
FIG. 1
FIG. 2
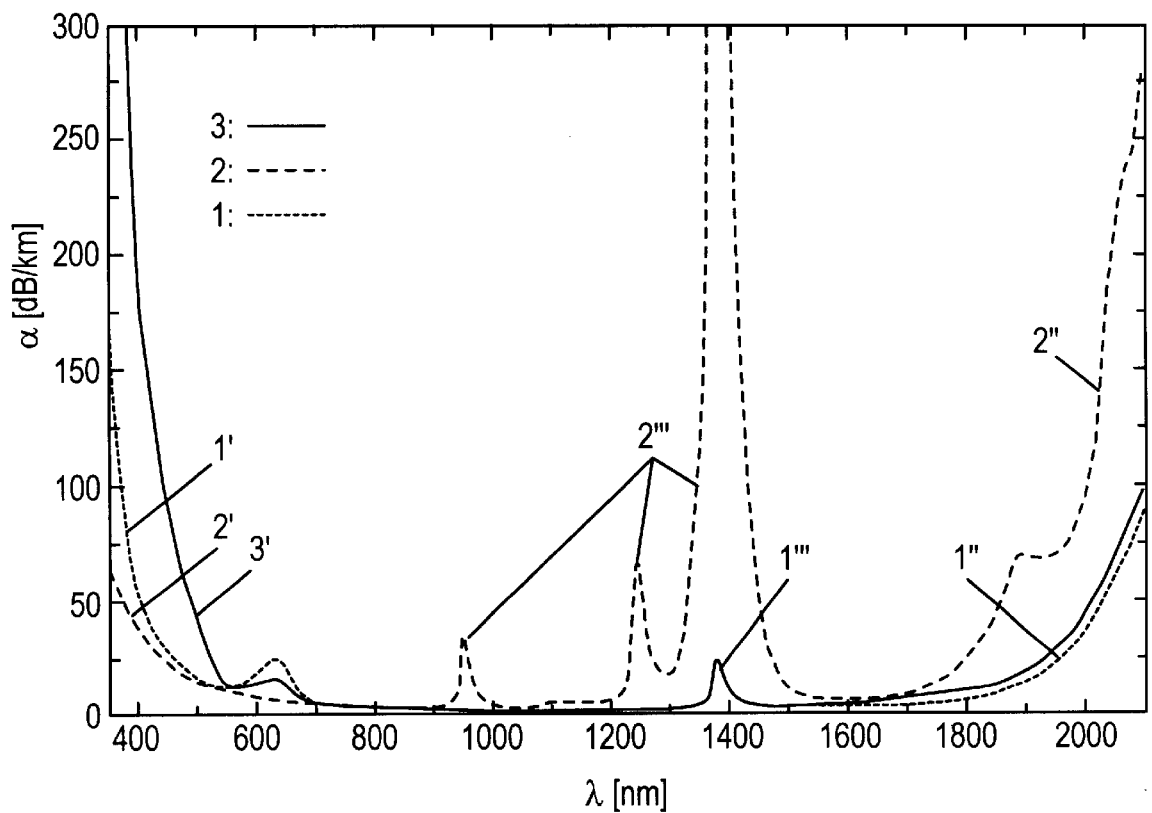

OPTICAL COMPONENT CONTAINING A MAXIMUM OF 200 WT.-PPM OF CHLORINE

The invention relates to an optical component having a cylindrical core glass of synthetic quartz glass which contains hydroxyl groups and a maximum 200 wt.-ppm of chlorine and no dopant in the form of a metal oxide, and which is axially enveloped by a glass cladding of doped quartz glass having a lower index of refraction than the core glass.

Subject matter of the invention can be, for example, an optical fiber or a preform for the production of an optical fiber. A preform with a core of synthetic quartz glass with low chlorine content and an optical fiber drawn from it is described for example in U.S. Pat. No. 4,650,511. To improve the long-term stability of the fiber in a moist or a hydrogen-containing atmosphere the chlorine content of the core glass is kept low. In an embodiment the chlorine content is set at 5 ppm and the hydroxyl group concentration of the core glass at 50 ppb. To increase the index of refraction the core glass is doped with germanium oxide. The known optical fiber is characterized by high resistance to the action of hydrogen and moisture. However it is suitable without limitation only for the transmission of light of specific wavelengths which are uninfluenced by absorption bands such as those caused, for example, by the dopant, germanium oxide.

An optical compound of this class is described in EP-A1 590 199. This is a so-called step index fiber with a cladding glass of fluorine-doped or boron-doped quartz glass surrounding a core glass of pure synthetic quartz glass. The core glass is substantially free of chlorine, its hydroxyl group content (OH content) is between 10 and 1000 ppm, and it contains fluorine in a concentration ranging between 50 and 5000 ppm, but no dopants in the form of metal oxides such as germanium oxide. The known optical fiber is characterized by high resistance to high-energy UV radiation.

It is known that optical fibers of quartz glass with an undoped core can have low attenuation values. In the publication of Gotaro Tanaka et al. in "Fiber and Integrated Optics," vol. 7, pp 47–56, a so-called single-mode fiber is described having a core of pure undoped quartz glass and with a jacket of fluorine-doped quartz glass. At light wavelengths of 1.5 $\mu$m, attenuation of less than 0.16 dB/km was measured. The theoretical attenuation minimum in such optical fibers is even slightly lower than this. For the transmission of optical radiation in the spectroscopy range, however, the absolute attenuation minima are less relevant; instead a low attenuation is desired over a wide wavelength range, typically from about 350 nm to 1000 nm and even up to 2100 nm. Such spectroscopic applications are combined under the term, "broad-band spectroscopy," hereinafter. The known optical fibers of quartz glass, however, on account of molecular vibrations of the hydroxyl groups, display either absorption bands in the infrared wavelength range, or in the UV wavelength range they have absorption bands of molecular chlorine or defects due to intrinsic structural defects. On account of such absorptions, either in the one or in the other boundary area of the relevant wavelength spectrum, the possibilities for the use of quartz glass fibers in broad-band transmission, especially in broad-band spectroscopy, have heretofore been limited.

The present invention therefore is addressed to the problem of offering an optical component of quartz glass suitable for broad-band transmission, especially for broad-band spectroscopy, which is characterized by low attenuation over a wide range of wavelengths.

This problem is solved by the invention, setting out from the optical component of the kind described above, in that the core glass contains less than 5 wt.-ppm of hydroxyl groups.

The core glass of the optical component of the invention is distinguished by a combination of features which can be characterized qualitatively as "low chlorine-content" at a simultaneously "very low OH content," and "freedom from metallic dopants." In synthetic quartz glass the chlorine content and OH content, however, are usually correlated in such a way that a low chlorine content entails a high OH content, and vice-versa, a low OH content results in a high chlorine content. This correlation is to be attributed to the conditions involved in making synthetic quartz glass. The flame hydrolysis processes or sol-gel processes used as a rule for this purpose result in intermediates with a comparatively high OH content. An especially effective method for reducing the OH content consists in treating the OH-laden quartz glass with chlorine or chlorine-containing substances. This treatment, however, causes the installation of chlorine in the synthetic quartz glass.

With this background it is understandable that synthetic quartz glass, which is simultaneously low in chlorine and low in OH or even free of OH, is not easily available. For the reduction of the OH content, however, still other processes come under consideration as alternatives or supplements to the conventional treatment in a chlorine-containing atmosphere, such as treatment in a fluorine-containing atmosphere, or the subsequent removal of chlorine from the intermediate product by a temperature, vacuum or gas treatment. Surprisingly it has been found that synthetic quartz glass, which has a chlorine content of no more than 200 wt.-ppm and at the same time a hydroxyl content of less than 5 wt.-ppm, and which is free of metallic dopants, is outstandingly suitable as a core glass for an optical component for use in broad-band spectroscopy. For a synthetic quartz glass of this kind is characterized by a broader spectral range with lower absorption in comparison with the known quartz glasses. Furthermore, the component according to the invention assures a substantially "true-color" transmission of optical radiation, that is, without change of the transmitted wavelength spectrum. This is important when the optical component is used in spectroscopy if near-reality is necessary over a wide range of wavelengths, as for example in astronomy. The absorption of the optical component of the invention in the ultraviolet range is shifted toward shorter wavelengths, which is to be attributed to the comparatively low chlorine content. On account of the low OH content the absorption in the infrared spectral range is shifted toward longer wavelengths. Moreover, absorption bands in the wavelength range from about 700 nm to 2700 nm, which can impair "true-color" transmission, are either weak or non-existent.

The wavelength range between 350 and 2100 nm is relevant to suitability for broad-band transmission. For use in broad-band spectroscopy the optical component is usually in the form of a so-called multimode fiber with a step index profile. The core glass is free of metallic dopants which have absorption bands in the relevant wavelength range. The quartz glass in the cladding is provided with dopants such as fluorine and/or boron which lower the refractive index of quartz glass.

The concentration figures given above refer to a value obtained across the diameter of the core glass. The OH content is determined by spectroscopy based on the absorption losses, and the concentrations of chlorine and fluorine by chemical analysis.

An additional improvement in regard to the use of the optical component of the invention for broad-band transmission, especially in broad-band spectroscopy is obtained when the core glass contains less than 1 wt.-ppm of hydroxyl groups. The absorptions of the core glass, which falsify and impair image transmission, especially in the infrared spectral range from about 700 nm to 2700 nm, are thereby further reduced.

In regard to broad-band use of the optical component it has been found desirable to limit the chlorine content of the core glass to no more than 100 wt.-ppm. This has an absorption-reducing effect especially in the ultraviolet spectral range.

An embodiment of the optical component of the invention has proven especially good, in which the core glass contains fluorine, the fluorine content amount to at least 2000 wt.-ppm.

Preferred, however, is a fluorine content in the core glass ranging between 5000 wt.-ppm and 15,000 wt.-ppm. This improves the gamma radiation resistance of the core glass, so that this variant of the optical component of the invention is also suitable for an application in which it is exposed to high-energy gamma rays, for example in nuclear power plants. Especially good results are obtained in this regard with a core glass having a fluorine content in the range of at least 6000 wt.-ppm to 10,000 wt.-ppm.

An optical component has proven especially suitable in which the cladding glass contains fluorine in a concentration ranging between 3 wt.-% and 5 wt.-%. Fluorine lowers the refractive index of quartz glass. A cladding glass with a fluorine concentration that high makes possible the manufacture of an optical fiber with a high numerical aperture, which is especially advantageous for the use of the fiber in broad-band spectroscopy.

The invention will be further explained hereinafter with the aid of an embodiment and a patent drawing. In particular the drawing shows in FIG. 1 a schematic representation of an optical stepped index and multimode fiber in a radial cross section, and FIG. 2 attenuation spectra of an optical multimode fiber made according to the invention, and two fibers for comparison, in the wavelength range of 350 to 2100 nm.

In FIG. 1, the reference number 1 is associated with a fiber which is designed for use in broad-band spectroscopy. For this purpose a number of similar fibers are combined in a bundle. The individual fiber 1 consists of a core 4, a cladding 5 radially surrounding the core 4 and having a common boundary surface therewith, and a protective layer 6 which forms the surface of the fiber 1 and consists of a polymer.

The representation in FIG. 1 is not to scale. The diameter of the fiber core 4 is about 200 μm, the outside diameter of the cladding 5 about 220 μm, and the protective layer 6 has a thickness of about 100 μm.

The fiber core 4 consists of pure synthetic quartz glass having uniformly distributed over the diameter of the core 4, 1 wt.-ppm OH, about 150 wt.-ppm of chlorine and about 2500 wt.-ppm of fluorine.

Fluorine-doped quartz glass is used as the mantle 5. The fluorine dopant causes a lowering of the refractive index relative to the core glass of $1.7 \times 10^{-2}$; this corresponds to a fluorine concentration of about 5 wt.-%. The numerical aperture of fiber 1 is approximately 0.22.

Since, except for the hydroxyl groups as well as fluorine and chlorine, pure quartz glass is used, low attenuation values can be achieved with the multimode fiber 1 over the wavelength range relevant to broad-band transmission. Due to the low chlorine content, absorption bands caused by molecular chlorine are entirely or at least partly prevented. In the fiber 1 according to the invention, however, such absorption bands as those provoked in the initially described known fiber due to doping with metal oxides such as germanium are not produced. The lowering of the refraive index in relation to the pure core glass, as required for the achievement of light conduction, is achieved by the fluorine doping of the cladding 5. But a high transmission over a great range of wavelengths, namely from about 350 nm to about 2100 nm, with the least possible variation of the signal spectrum, is important in view of the special use of the fiber 1 in broad-band spectroscopy. This latter requirement is satisfied especially by the very low OH content of the core 4, of 1 wt.-ppm.

The making of the fiber schematically represented in FIG. 1 is described as follows: The fiber 1 is drawn from a preform. To make the preform, $SiO_2$ particles are deposited by the flame hydrolysis of $SiCl_4$ onto a rotating support. The porous piece thus formed has an OH content of about 500 ppm. To reduce the OH content the piece is treated for 1.5 hours in a helium atmosphere to which 0.5 vol.-% of $SOF_2$ is admixed. This treatment, furthermore, serves to dope the core material with fluorine. After the piece cools it is vitrified in a sintering furnace at 1600° C. to form a hollow cylinder.

The vitrified hollow cylinder thereafter has a hydroxyl content of less than 1 wt.-ppm, a chlorine content of no more than 200 wt.-ppm and a fluorine content of about 4000 wt.-ppm.

By collapsing the piece a core rod is produced, on the cylindrical outer surface of which a silica glass cladding layer is deposited which is doped with fluorine. The depositing process is described in U.S. Pat. No. 4,162,908. The fluorine content of the cladding glass is adjusted to about 5 wt.-%.

The preform is then drawn to form the fiber 1 with the external dimensions stated above, and the protective sheath 6 is applied to it.

In a similar manner, two fibers 2 and 3 were made for comparison, which differ only in their core glass compositions from that of the fiber 1. In Table 1 are shown the concentration data measured in the core glasses of fibers 1, 2 and 3 with respect to OH, chlorine and fluorine.

TABLE 1

| Fiber Number | OH Content [wt.-ppm] | Chlorine Content [wt.-ppm] | Fluorine Content [wt.-ppm] |
| --- | --- | --- | --- |
| 1 | 1 | 150 | 2,500 |
| 2 | 7 | 180 | 4,000 |
| 3 | 1 | 2,000 | — |

In FIG. 2 the attenuation α (in dB/km) over the wavelength λ is represented (in nm), for fibers 1, 2 and 3. From the attenuation curve of the fibers 1 made according to the invention the following is to be noted in comparison to the other two fibers 2 and 3: The UV absorption edge 1' of the fiber 1 is clearly shifted toward shorter wavelengths and is approximately comparable with the UV absorption edge 2' of fiber 2. This property of fiber 1 can be attributed to the comparatively low chlorine content of the fiber core 4.

The absorption 1" of fiber 1 in the infrared wavelength range does not begin until above about 1800 nm. Of the attenuation spectra represented in FIG. 2, fiber 1 shows the lowest absorption 1" in the infrared wavelength range up to about 2100 nm. Especially striking is the difference from the absorption 2″ of fiber 2 in this wavelength range. This property of fiber 1 according to the invention is to be attributed to the especially low hydroxyl content of fiber core 4.

Another important property of fiber 1 of the invention is to be seen in comparison with the attenuation spectrum of fiber 2 in the wavelength range from 800 nm to 1600 nm. Although fiber 7 has a relatively low hydroxyl content at 7 wt.-ppm, it nevertheless shows definite absorption bands 2‴ which are to be attributed to OH vibrations. In fiber 1 by contrast only one smaller absorption band 1‴ can be seen in this wavelength range at about 1385 nm (in the graph of FIG. 2 the attenuation curves of fibers 1 and 3 lie one on the other). The low absorption of fiber 1 of the invention assures that an especially broad spectrum can be transmitted, and that without falsification of the spectrum. This property contributes to the suitability of fiber 1 of the invention for near-reality image transmission.

Fiber 1 of the invention thus is characterized by low absorption both within and at the boundaries of the wavelength spectrum relative to its application. It is therefore suitable chiefly for use in broad-band spectroscopy.

The optical component according to the invention is also especially well suited for the transmission of light under gamma radiation such as occurs in a nuclear power plant, for example. To show this, two optical fiber optics similar to fiber 1 were made. Unlike fiber 1, the core of the one fiber optic was doped with 7000 wt.-ppm of fluorine, while the core of the other fiber optic had, like fiber 1, a fluorine content of 4000 wt.-ppm.

After their attenuation was measured at a wavelength of 865 nm, both fiber optics were exposed to a dose of 1 Mrad of gamma radiation. Then the attenuation induced by the radiation was measured. It is found that in the fiber optic with the core of the greater fluorine doping the radiation-induced attenuation of 5 db/km proved to be decidedly lower than in the other fiber optic.

What is claimed is:

1. Optical component with a cylindrical core glass of synthetic quartz glass containing hydroxyl groups, a maximum 200 wt.-ppm of chlorine, and no doping in the form of a metal oxide, and with a cladding glass axially surrounding the core glass and consisting of doped quartz glass having a lower index of refraction than the core glass, characterized in that the core glass contains less than 5 wt.-ppm of hydroxyl groups, wherein the core glass contains at least 2000 wt.-ppm fluorine.

2. Optical component according to claim 1, wherein the core glass contains less than 1 wt.-ppm of hydroxyl groups.

3. Optical component according to claim 1, wherein the chlorine content of the core glass amounts to 100 wt.-ppm at most.

4. Optical component according to claim 1, wherein the fluorine content of the core glass is in the range between 5000 wt.-ppm and 10,000 wt.-ppm.

5. Optical component according to claim 1, wherein the cladding glass contains fluorine in a concentration in the range between 3 wt.-% and 5 wt.-%.

* * * * *